April 25, 1939.   J. KAHN ET AL   2,156,221
THREAD PROTECTOR
Filed May 3, 1937
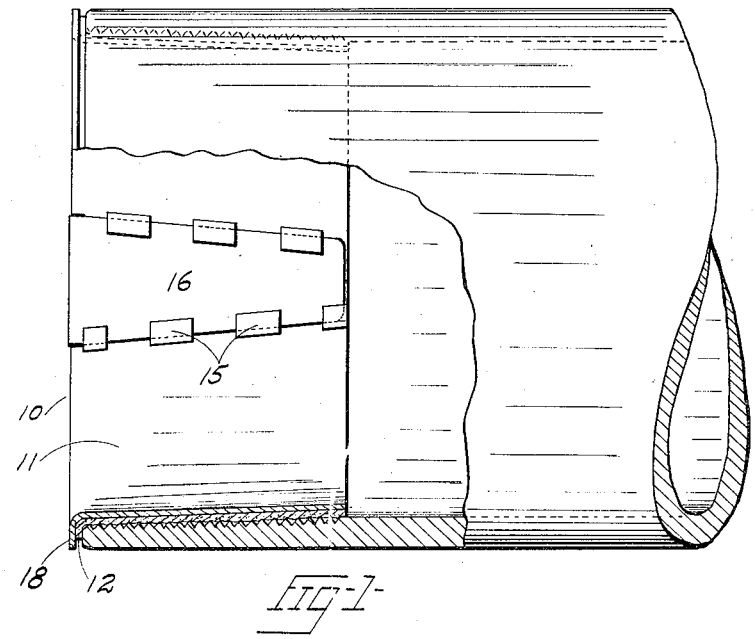
Fig-1-
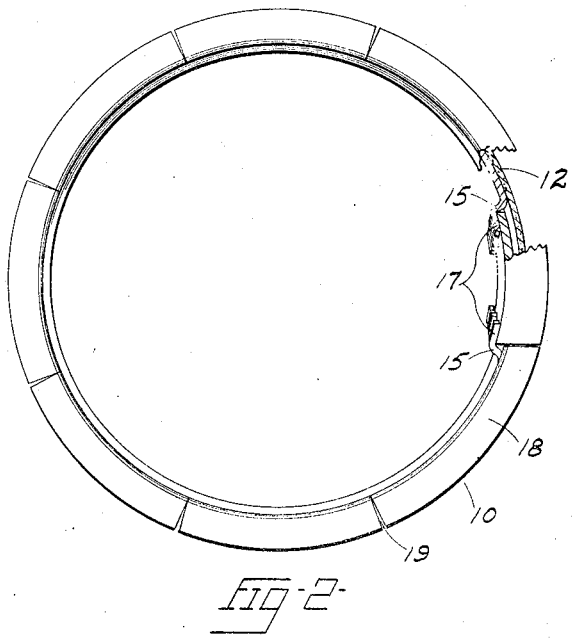
Fig-2-
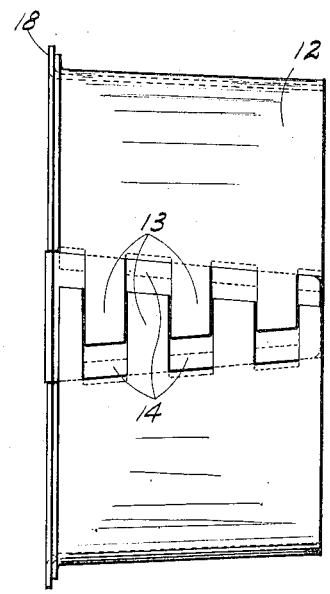
Fig-3-
JULIUS KAHN AND
WALTER F. SCHULZ.   INVENTOR.
BY
ATTORNEY.

Patented Apr. 25, 1939

2,156,221

UNITED STATES PATENT OFFICE 2,156,221

THREAD PROTECTOR

Julius Kahn and Walter F. Schulz, Cleveland Heights, Ohio, assignors to Republic Steel Corporation, Cleveland, Ohio, a corporation of New Jersey Application May 3, 1937, Serial No. 140,310

1 Claim. (Cl. 138—96)

This invention relates in general to thread protectors, and more particularly to improvements in metal sleeves for shielding the threaded end portion of pipes, tubes and similar articles of manufacture.

An object of this invention is the provision of a sleeve which may be readily formed by blanking and forming dies and assembled upon the end of a pipe without necessity of further machine work thereon or the use of special assembling tools.

Another object of the invention is the provision of a device for the protection of the threaded end of a pipe which is economical of manufacture, durable, and susceptible of ready assembly.

A further object of the invention is the provision of a protector for the threaded end of a pipe having a simple, yet efficient, locking device for securing the same upon the end of a pipe and preventing dislodgement thereof during the handling of the pipes in transit.

Other objects more or less ancillary to the foregoing, and the manner in which all of the various objects and advantages are obtained, will become apparent from a more complete examination of the following specification and claim wherein there is assembled and pointed out certain combinations of parts and specific instructions indicative of the scope and spirit of the invention.

Referring to the drawing which illustrates the preferred embodiment of the invention, Fig. 1 is a sectional view of a threaded pipe having the improved thread protector sleeve mounted therein.

Fig. 2 is an end elevational view of the protector illustrated in Fig. 1.

Fig. 3 is a side elevational view partly in section of the protector illustrating the improved locking device.

Referring particularly to Figs. 2 and 3 the protector 10 may be die struck from a flat sheet metal blank and subsequently formed into annular shape, the outer periphery of the body portion 11 being formed slightly smaller than the diameter of the threads or end of the pipe to permit the application of a felt, rubber, or fabric packing material 12, intermediate the threads and the outer periphery of the sleeve. The body portion 11 of the sleeve may be slightly tapered from the outer to the inner end thereof to insure bearing or contact of the packing material throughout the threaded portion of the pipe.

During the blanking operation the free ends of the body portion 11 are trimmed to provide tongues or lugs 13 and notches 14 of complemental configuration, the tongues adapted for sliding engagement within the notches to retain the free ends of the sleeve in alignment when the same is formed into annular shape.

The metal adjacent the root of each of the notches 13 is deformed to provide key retaining lugs or ears 15 on the inner surface of the sleeve. These ears may be disposed on converging lines from the outer to the inner and on each of the free ends of the body portion of the sleeve, thus forming a tapered socket to accommodate a tapered wedge key 16, the ends of the ears 15 being bent as at 17 to retain the key in position.

The outer end of the body portion of the sleeve may be bent outwardly through a 90° angle to form a protecting flange 18 for the end of the pipe, and may be provided with a number of splits or skarfs 19 which permit a certain amount of resiliency in the flange facilitating the assembly and removal of the sleeve upon the pipe sections.

The packing material 12 may be affixed to the body portion of the sleeve by any suitable adhesive material or by rivets, and may be impregnated with a lubricant to preserve the threaded portion of the pipe during storage or shipment.

In assembling the protector upon a pipe the key 16 is removed and the sleeve is compressed to permit entry into the end of the pipe, the key is then inserted between the inclined faces of the lugs or ears 15 and driven home, the inclined edges thereof expanding the sleeve and urging the packing material into intimate engagement with the threads of the pipe section, thereby securely locking the same in place.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

A protector for threads inside a pipe at one end thereof, comprising a longitudinally split annulus having a row of alternately disposed long and short lugs at each edge of the split, the short lugs of each row projecting inwardly radially of the annulus and concentrically thereof to form a wedge receiving space between the long and short lugs of each row, the long lugs of one row lying between and circumferentially overlapping the long lugs of the opposed row, and a wedge having opposite converging edges to engage between the lugs of each row and to spread said rows of lugs apart and expand the annulus against the inside of a pipe, said wedge being overlapped by the long and short lugs.

JULIUS KAHN.
WALTER F. SCHULZ.